April 25, 1950  C. G. SIMMONS ET AL  2,505,216
BELT INSTALLING TOOL
Filed Nov. 27, 1946

Inventors.
CURTIS G. SIMMONS
JAMES H. ARMSTRONG
by
Attys.

Patented Apr. 25, 1950

2,505,216

UNITED STATES PATENT OFFICE 2,505,216

BELT INSTALLING TOOL

Curtis G. Simmons and James H. Armstrong,
Atlanta, Ga.

Application November 27, 1946, Serial No. 712,570

5 Claims. (Cl. 74—242.7)

The present invention relates generally to a belt installing tool and more particularly to a tool for use in applying the usual belt employed to drive the cooling fan of an automobile engine, which belt is sometimes referred to as a fan belt.

Present day automobile construction utilizes fan belts usually of V-type where a fan belt is driven by a pulley directly or indirectly connected to the crankshaft of the engine and drives a fan pulley secured to the fan shaft.

In some automobiles the fan belt is used to drive another pulley, such, for example, as a pulley for operating the water pump or some other instrumentality of the engine structure.

Fan belts are made as endless loops and are constructed so as to have little if any stretch, without sacrificing flexibility.

To remove a worn fan belt and to apply a new one has heretofore been time consuming and difficult, as much effort is required to remove such a belt from the groove of a pulley and to apply a new belt over a flange of a groove of the fan pulley, or other pulley in a series, as a new belt is somewhat stiff and hard to stretch. Where tools such as screw drivers or the like are used, often the belts are damaged in applying them to the fan belt pulleys.

The tool of the present invention overcomes the difficulties heretofore experienced.

According to the present invention the tool is made as an integral structure and includes a handle and a head, the head being disposed in angular relation to the length of the handle and having its under surface provided with a shoulder which acts as a fulcrum when the tool is applied to the flange of a V-groove pulley and the upper face of which head is formed as a cam to readily slide the belt into the pulley groove as the pulley is rotated, moving the tool and belt with it.

Accordingly the present invention has for an object the provision of a tool which will expedite the application of a new belt to a pulley of a series.

Another object of the present invention is to provide a tool for installing a belt on grooved pulleys, which tool includes a head portion having a flange to fit over a part of the groove flange of a pulley, having a cam surface to guide a belt into the pulley groove and having a handle as an integral part for manipulating the tool to direct the belt into the pulley groove.

A further object of the present invention is to provide a one-piece tool for applying a belt to the V-groove of a pulley, and which tool is simple in construction, positive in operation and easy to manipulate.

A still further object of the present invention is to provide a belt applying tool which is economical to manufacture, and designed to be manufactured on a quantity production basis at relatively low cost.

The invention has for an additional object the provision of a belt applying tool formed as an integral structure with a head and handle, and with the head in twisted relation with respect to the length of the handle.

The above, other and further objects of the present invention will be apparent from the following description and accompanying drawing.

The preferred embodiment of the present invention is illustrated in the accompanying drawing and the views thereof are as follows.

As shown on the drawing.

Figure 1:
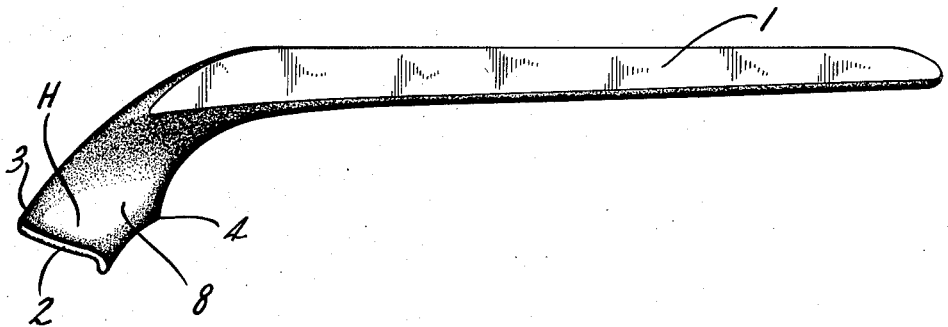
Figure 1 is a view of the tool in plan and showing certain features of the relationship of the head with respect to the handle.

The illustrated form of tool comprises a handle 1 and a head H. The handle may be substantially rectangular in cross section, or of other cross-sectional shape as meets the requirement of the manufacturer. Figure 1 shows the handle 1 as tapered slightly from the right end to the left end, with the taper increasing, and shows the head H disposed in angular relation to the handle. The head H may be said to be twisted at an obtuse angle with respect to the handle, although the tool is made preferably as a casting.

For convenience of description the margin 2 of the head will be herein designated as the end margin, the margin 3 as the rear margin, and the margin 4 as the front margin. The front margin 4 is formed with a flange or shoulder 5 along it and projecting from the under surface of the head, the under surface being designated as 6.

Figure 2:
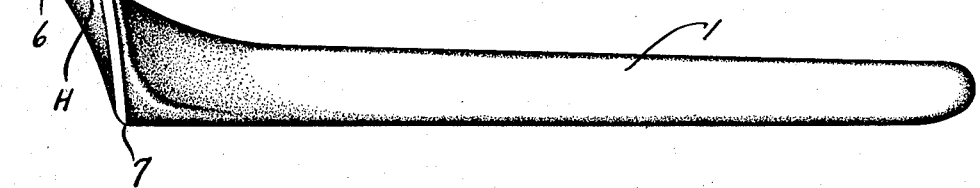
Figure 2 is another view of the tool in plan at approximately 90° to the disclosure of Figure 1.

It will be noted, from reference to Figure 2, that the front margin 4 of the head merges at 7 with the handle portion at an abrupt angle. The rear margin 3 of the head is curved and merging with the handle 1 as shown. It is to be noted that the flange or shoulder 5 is curved concavely lengthwise of the front margin.

The upper surface 8 of the head is constructed to provide a cam or wedge surface. Preferably upper surface 8 of the head is convexly curved lengthwise and concavely curved widthwise of the head.

Figure 3:
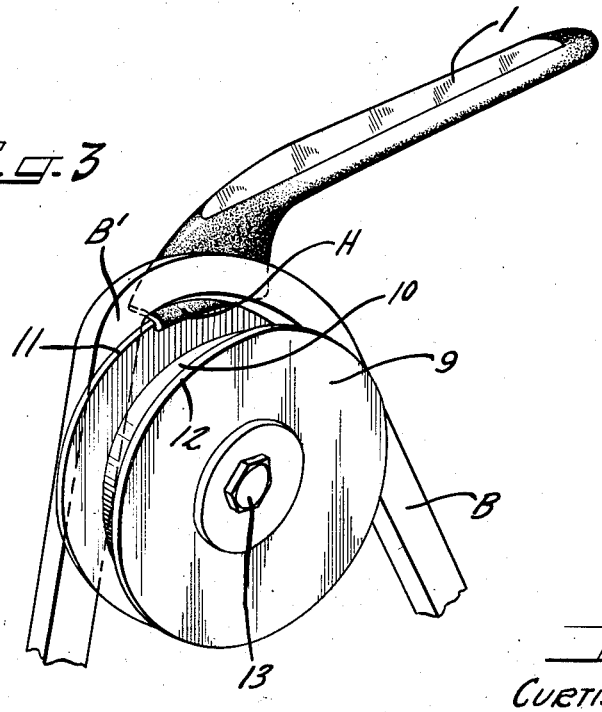
Figure 3 is a fragmentary view showing a grooved pulley and the manner of utilizing the tool of the present invention to apply a belt of a pulley.

Figure 3 illustrates a grooved pulley 9 having a groove 10 substantially rectangular in shape. The groove 10 is defined by flanges 11 and 12 of the pulley. The pulley 9 is mounted on a fan shaft 13 in driving relation.

The belt B of endless type and constructed as a fan belt is in cross section comparable to the shape of the groove 10 of the pulley 9.

It is to be understood that the other pulleys of the series, of which the pulley 9 is one, are grooved in a manner similar to pulley 9.

In applying a belt B to the pulley 9, the belt B is first of all applied over the driving pulley, and if there is a third pulley in the series then one run of the belt is passed over the third pulley. A portion of the run of the belt is then laid in the groove 10 of a pulley 9. Because of the stiffness of the belt and its lack of elasticity, considerable effort is necessary to move the portion B' of the belt over a flange of the pulley 9. Figure 3 illustrates the application of the belt to the pulley as being made over the peripheral flange 11 of the pulley.

To apply such belt, the tool of the present invention is engaged with its head H underneath a bight of the belt and its flange or shoulder 5 of the front end engaged over a marginal portion of the flange 11 of the pulley. The tool is moved along the flange 11, to the right as shown in Figure 3, until the belt is tightly against the upper surface 8 of the head, as shown in Figure 3. Because of the convexity of the upper surface 8 of the head the bight B' will, when the tool is manipulated, easily slide off of the head into the pulley groove.

With the tool applied to a pulley as shown in Figure 3 and with a part of the belt over the tool head, the pulley is rotated to the left, i. e., counterclockwise. The rotation of the pulley may be carried out by hand and, in the case of fan belts, the fan is rotated by the operator grasping a fan blade and pulling to the left, as viewed in Figure 3. It is to be understood that any suitable means for rotating the pulley may be used. The belt and tool move with the pulley as it is rotated.

In applying a fan belt to the pulleys of the fan system the tool is generally applied to the pulley that is most accessible—in recent cars this accessible pulley is the generator pulley.

As the pulley, belt and tool are moved together as described the belt will eventually engage in the groove of the said pulley, to thereafter operate the pulley system as the driving pulley is rotated.

The tool has herein been illustrated as a right handed tool, but is not to be limited to such arrangement, as it could be made as a left handed tool, if occasion requires, without departing from the concept of the present invention.

It will be noted that our tool may be used for applying all types of V belts and also round belts.

In addition to being a time saver and a tool which prevents damage to a belt, it is also a safety tool eliminating the possibility of pinched or bruised fingers or hands of the user, which often occur when a belt is applied by prying action.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. A device for applying a belt to one of two V-pulleys comprising a tool having a head with an underflange to hook over a portion of the periphery of a pulley, the upper surface of the head being convexly curved lengthwise and concavely curved widthwise to form a cam surface to guide a belt toward the pulley groove as the tool is rotated with a pulley.

2. A tool for applying an endless belt to a grooved pulley as one of a series, said tool comprising a handle, a head at one end thereof bent in obtuse angular relation with respect to the handle lengthwise and widthwise thereof, said head having a front margin which is concavely curved in elevation and which includes a flange extending downwardly below the under surface of the head.

3. A device for applying a belt to one of two V-pulleys comprising a hand tool having a head with an underflange to hook over a portion of the periphery of a pulley, the upper surface of the head being convexly curved lengthwise and concavely curved widthwise to form a cam surface to guide a belt toward the pulley groove as the handle is moved with the pulley as the same is rotated, said head being twisted with respect to the handle to present the said underflange at substantially a right angle to the length of the handle.

4. A tool for applying an endless belt to a grooved pulley comprising an elongated shank and a head portion connected to said shank, said head having an underflange and an inner marginal edge for hooking over an outer peripheral edge of a pulley, the intersection of said shank and said head defining an upright cam surface slanting from the leading outer edge of the head to the trailing inner edge thereof to urge a belt inwardly over said underflange and onto the pulley.

5. A tool for applying a belt to a pulley comprising an elongated shank portion and a head connected to said shank, said head having an underflange for engaging over a peripheral portion of a pulley, a substantially flat belt-supporting upper surface disposed during operation substantially at right angles to the side face of the pulley, and an upright diagonal cam surface slanted inwardly from the outer corner of the leading edge of said head to the inner corner of the trailing edge thereof urging the belt inwardly as said head moves with the rotating pulley.

CURTIS G. SIMMONS.
JAMES H. ARMSTRONG.

REFERENCES CITED

The following references are of record in the file of this patent:

UNITED STATES PATENTS

| Number | Name | Date |
|---|---|---|
| 1,666,789 | Pobanz | Apr. 17, 1928 |
| 2,121,129 | Malone | June 21, 1938 |

FOREIGN PATENTS

| Number | Country | Date |
|---|---|---|
| 480,324 | Germany | July 31, 1929 |